United States Patent
Bohra

(10) Patent No.: US 10,965,613 B2
(45) Date of Patent: Mar. 30, 2021

(54) MULTI-PIPE BANDWIDTH CONTROL IN HOSTED SYSTEMS

(71) Applicant: VMware, Inc., Palo Alto, CA (US)

(72) Inventor: Ata E. Husain Bohra, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 29 days.

(21) Appl. No.: 16/245,203

(22) Filed: Jan. 10, 2019

(65) Prior Publication Data
US 2020/0228462 A1     Jul. 16, 2020

(51) Int. Cl.
| | |
|---|---|
| G06F 15/16 | (2006.01) |
| H04L 12/911 | (2013.01) |
| H04L 12/863 | (2013.01) |
| H04L 12/873 | (2013.01) |
| H04L 12/825 | (2013.01) |

(52) U.S. Cl.
CPC ............ H04L 47/788 (2013.01); H04L 47/25 (2013.01); H04L 47/527 (2013.01); H04L 47/623 (2013.01)

(58) Field of Classification Search
CPC ..... H04L 47/788; H04L 47/25; H04L 47/527; H04L 47/623
USPC .......................................... 709/226; 711/100
See application file for complete search history.

(56) References Cited

U.S. PATENT DOCUMENTS

| | | | |
|---|---|---|---|
| 9,047,189 B1 * | 6/2015 | Gupta ................. | G06F 11/10 |
| 9,311,207 B1 * | 4/2016 | Marshak ............ | G06F 11/3419 |
| 9,904,969 B1 * | 2/2018 | Westerhoff ............ | H04L 12/413 |
| 2004/0010585 A1 * | 1/2004 | Jones, Jr. .............. | H04L 47/762 709/224 |
| 2005/0013245 A1 * | 1/2005 | Sreemanthula ....... | H04L 1/0015 370/229 |
| 2005/0066118 A1 * | 3/2005 | Perry .................. | G06F 11/1469 711/112 |
| 2005/0160188 A1 * | 7/2005 | Bogin .................. | G06F 13/161 710/1 |
| 2013/0173849 A1 * | 7/2013 | Balakrishnan ........ | G06F 3/0679 711/103 |
| 2015/0074394 A1 * | 3/2015 | Nagai .................. | H04L 9/0838 713/168 |
| 2017/0336986 A1 * | 11/2017 | Cooke .................. | G06F 3/0611 |
| 2017/0371785 A1 * | 12/2017 | Boyd .................. | G06F 12/0804 |
| 2018/0165214 A1 * | 6/2018 | Farmahini Farahani .................... G06F 12/0888 |

(Continued)

*Primary Examiner* — David R Lazaro
*Assistant Examiner* — Mariegeorges A Henry
(74) *Attorney, Agent, or Firm* — Fish & Richardson P.C.

(57) ABSTRACT

Techniques are described that allow each host in a multi-host system to throttle its bandwidth between multiple data nodes without the need to coordinate with the other hosts. Specifically, techniques are described in which a limit is applied to the amount of sent-but-not-acknowledged data a given host may have. If the host has reached the limit, the host must wait for acknowledgements before sending more data. In one embodiment, the limit is enforced using a token-based bandwidth control. Embodiments are described in which the limit on sent-but-not-acknowledged data varies dynamically based on system conditions. Specifically, each host may monitor its aggregate latency, and increase the limit when latency is low (indicating low-congestion conditions), and decrease the limit when latency is high (indicating high-congestion conditions).

20 Claims, 5 Drawing Sheets

(56) References Cited

U.S. PATENT DOCUMENTS

2019/0342217 A1* 11/2019 Mazurek ................ H04L 47/11

* cited by examiner

MULTI-PIPE BANDWIDTH CONTROL IN HOSTED SYSTEMS

FIELD OF THE INVENTION

The present invention relates to bandwidth control and, more specifically, to multi-pipe bandwidth control in hosted systems.

BACKGROUND

In computer systems in which host nodes store data at data nodes on behalf of guest applications that are running on the host nodes, it is difficult to ensure that the bandwidth between the host nodes and the data nodes is shared fairly between the host nodes. Referring to FIG. 1, it is a block diagram of a system in which N host nodes write data to M data nodes. Such write operations occur over a network (or networks) that have finite bandwidth. In the absence of any coordination among the host nodes, it is possible for a few host nodes to use a disproportionally large amount of the available bandwidth to the data nodes, negatively impacting the performance of the other host nodes.

To allocate the host-to-data-node bandwidth in a fair manner, the host nodes may coordinate their write operations with each other. However, the messages between the host nodes that would be needed to coordinate writes to the data nodes to ensure that the bandwidth is shared fairly would themselves add overhead and consume bandwidth, thus negatively impacting the performance of all host nodes.

TCP is a protocol for sending messages over a network. Using TCP, a sending node sends data to a receiving node as quickly as the data is available to send, until packets start dropping. When packets start dropping, the sending node resends the dropped packets, reducing the size of the packets and/or slowing the rate of transmission until packets stop being dropped. After packets cease to be dropped, the transmission rate is allowed to increase until packets start being dropped again.

TCP has the advantage of throttling a host's communication rates over a single connection without requiring inter-host communications. However, throttling transmission rates over a single connection merely to reduce packet loss with individual receivers does not prevent a host node or set of host nodes from consuming a disproportionate amount of host-to-storage bandwidth. For example, a single host may be consuming virtually all of the bandwidth between itself and a data node before the host node starts to experience dropped packets. Thus, TCP does not itself solve the problem of providing a fair allocation of bandwidth among host nodes that are writing to storage nodes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
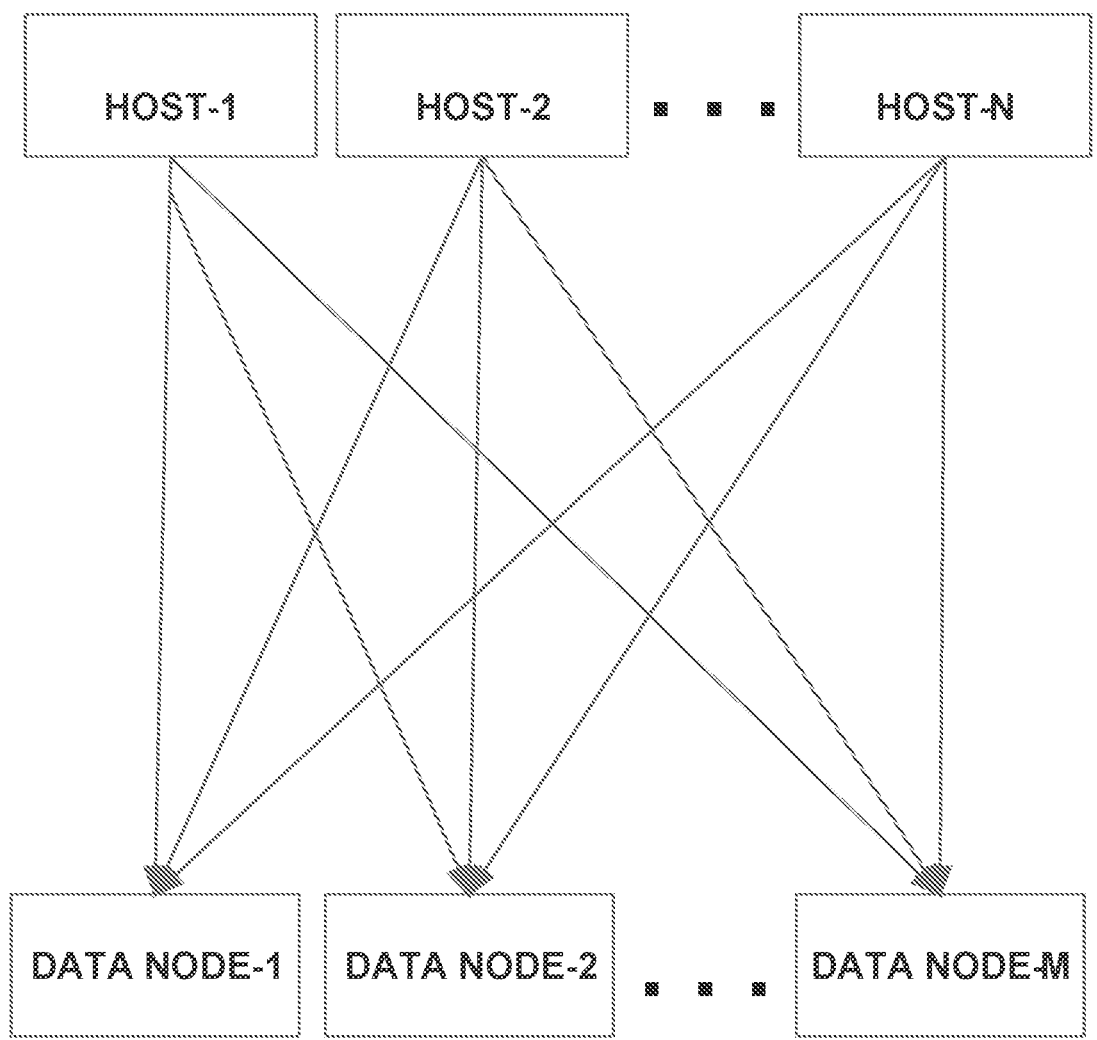
FIG. 1 is a block diagram illustrating a many-to-many relationship between host nodes and data nodes.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein that allow each host in a multi-host system to throttle its bandwidth between multiple data nodes without the need to coordinate with the other hosts. Specifically, techniques are described in which a limit is applied to the amount of sent-but-not-acknowledged data a given host may have. If the host has reached the limit, the host must wait for acknowledgements before sending more data. In one embodiment, the limit is enforced using a token-based bandwidth control, which shall be described in greater detail hereafter.

In one embodiment, the limit on sent-but-not-acknowledged data varies dynamically based on system conditions. Specifically, each host may monitor its aggregate latency, and increase the limit when latency is low (indicating low-congestion conditions), and decrease the limit when latency is high (indicating high-congestion conditions). Thus, unlike TCP, the factor that affects throttling is latency over multiple connections, and that latency affects throttling relative to multiple connections.

Token-Based Bandwidth Control

According to one embodiment, token-based bandwidth control is used to govern host-to-data-node bandwidth usage. Specifically, each host maintains a "token pool" that includes a certain number of tokens. Each token represents a fixed measure of bandwidth usage. For the purpose of explanation, examples shall be given herein where each token represents 1 megabyte.

The tokens within a token pool are either "available" or "unavailable". Initially, all tokens in the token pool are available. When a host transmits data to data nodes, some "available-tokens" in the token pool are converted to "unavailable-tokens". The number of available-tokens that are converted to unavailable-tokens for any given transmission is based on the amount of data that was transmitted. For example, assume that a host is configured to transmit data in 8 megabyte data items. If a host sends an 8 megabyte data item to the data nodes, and each token corresponds to 1 megabyte, then 8 available-tokens would be converted to unavailable-tokens.

When a host receives an acknowledgement that data that has been transmitted to the data nodes has been successfully received by the data nodes, the appropriate number of unavailable-tokens in the host's token pool are converted back to available-tokens. The number of unavailable-tokens that are converted back to available-tokens is based on the amount of data that was successfully received by the data nodes. Thus, when successful reception of all 8 megabytes of a data item are acknowledged by the data nodes, 8 1-megabyte unavailable-tokens are converted to available-tokens.

Because tokens are made unavailable when data is sent, and made available again when the sent data is acknowledged, the current number of unavailable-tokens in a node is an indication of the amount of sent-but-not-acknowledged data for the host node. Since the number of tokens in a host's token pool is finite, that number imposes a limit on the amount of sent-but-not-acknowledged data the node may have at any point in time.

If there are insufficient available-tokens in a host's token pool to send a particular data item, that data item waits in the host until there is a sufficient number of available-tokens. The longer the latency between transmissions and acknowledgements, the longer it will take for the necessary number of unavailable-tokens to be converted to available-tokens. Since the latency of acknowledgements is an indication of congestion between the hosts and data nodes, token-based bandwidth control will cause each host to reduce its bandwidth usage during times of high congestion (i.e. times of high latency), and increase its bandwidth usage during times of low congestion (i.e. times of low latency).

Using token-based bandwidth control, the rate at which any host is able to transmit data is based on both (a) the total number of tokens allocated to a host's token pool and (b) the latency of transmission acknowledgements. According to an embodiment that will be described in detail below, the total number of tokens that are allocated to a host varies dynamically based on the transmission latency experienced by the host. As transmission latency of a host increases, the token allocation for the host decreases. Conversely, as transmission latency of a host decreases, the token allocation for the host increases.

System Overview

Figure 2:
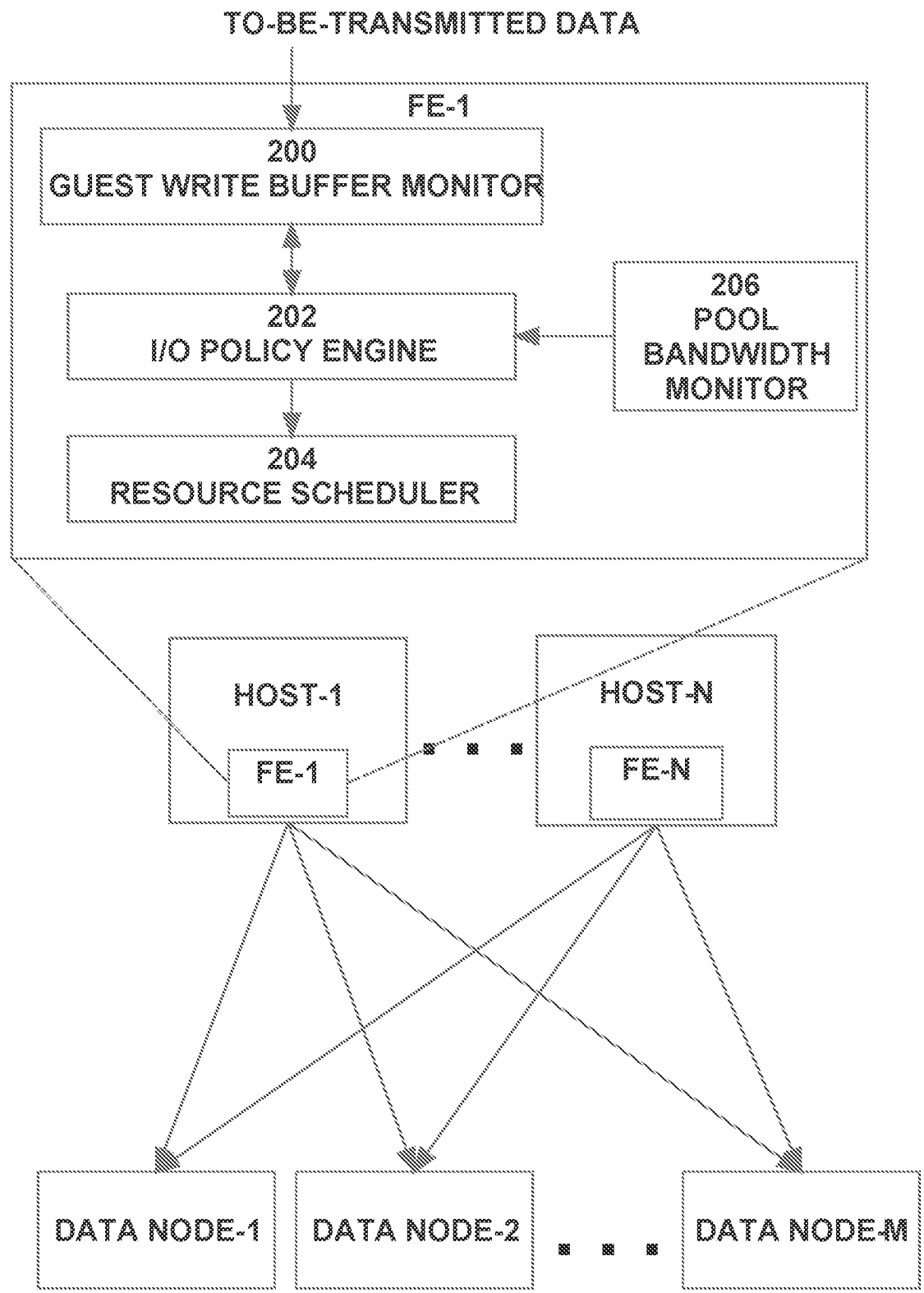
FIG. 2 is a block diagram illustrating a system in which a front-end, within each host node, employs logic to throttle bandwidth usage with data nodes without coordinating with other host nodes, according to an embodiment.

FIG. 2 is a block diagram of a system that implements token-based bandwidth control, according to an embodiment. As illustrated in FIG. 2, each host has a front-end module (FE-1 to FE-N). Each front-end is responsible for managing the transmission rate of the host in which it resides. Significantly, the transmission rates are managed in a manner that (a) does not require inter-host communication, and (b) increases the likelihood that no host will consume a disproportionate amount of the bandwidth between the hosts and the data nodes.

As illustrated in FIG. 2, each front-end module includes a guest write buffer monitor 200, an I/O policy engine 202, a resource scheduler 204 and a pool bandwidth monitor 206. Each of these components, and how they interoperate to govern the bandwidth usage of the host to which they belong, shall be described in greater detail hereafter.

Pool Bandwidth Monitor

Pool bandwidth monitor 206 monitors the bandwidth available between (a) the host in which the pool bandwidth monitor 206 resides, and (b) the set of data nodes (data nodes 1-M). In the example illustrated in FIG. 2, pool bandwidth monitor 206 resides in host-1, and therefore monitors the bandwidth available between host-1 and data nodes 1-M.

Various mechanisms may be used by pool bandwidth monitor 206 to determine the available bandwidth. For example, in one embodiment, pool bandwidth monitor 206 monitors latency between host-1 and data nodes 1-M by tracking the time that elapses between (a) sending data, and (b) receiving acknowledgements that the data was successfully received.

The pool bandwidth monitor 206 calculates the aggregate latency of writes performed by host-1, rather than the latency experienced with any given data node. The aggregate latency is a host-level latency that is derived from latencies experienced during writes to multiple individual data nodes (write-level latencies). The aggregate host-level latency more accurately reflects the congestion between the host nodes and the data nodes than the write-level latency that host-1 may experience with any individual data node.

Pool bandwidth monitor 206 periodically communicates the aggregate host-level latency information to I/O policy engine 202. For example, pool bandwidth monitor 206 may divide time into fixed-duration time windows. Then, during each time window, pool bandwidth monitor 206 may monitor the latency of all write operations of host-1. At the end of each time window, pool bandwidth monitor 206 may calculate the average write-level latency across all data nodes during that time window, and send that aggregated host-level average latency to I/O policy engine 202.

I/O Policy Engine

The I/O policy engine 202 adjusts the amount of tokens in the token pool of host-1 based on feedback provided by the pool bandwidth monitor 206. In response to feedback from pool bandwidth monitor 206 that indicates that available bandwidth is increasing (e.g. aggregate acknowledgement latency is low), the number of tokens in host-1's token pool is increased. In response to feedback from pool bandwidth monitor 206 that indicates that available bandwidth is decreasing (e.g. aggregate acknowledgement latency is high), the number of tokens in host-1's token pool is decreased. The exact logic used to determine have to adjust the number of tokens in the token pool dynamically based on changes in bandwidth availability will vary from implementation to implementation. For example, in one embodiment, tokens are removed when host-level latency rises above a first threshold, and tokens are added when host-level latency falls below a second threshold. As long as host-level latency remains between the two thresholds, the number of tokens in the token pool remains constant. The techniques described herein are not limited to any particular token-number-adjustment policy.

In one embodiment, the policies employed by I/O policy engine 202 establish a minimum token pool size. The minimum token pool size is established such that the largest single write operation can be accommodated. For example, in a host that is configured to transmit data in fixed-size data items, the number of tokens in the token pool is never allowed to be reduced below the number necessary to transmit a single data item. For example, in a host that is configured to transmit data in 8 megabyte data items, if tokens correspond to 1 megabyte, then the token pool is never reduced to fewer than 8 tokens.

In addition to having a minimum number of tokens, the policies employed by I/O policy engine may also establish a maximum pool size. For example, to avoid unfair allocation of the bandwidth available to the hosts, it may be determined that 2 gigabytes/second is the maximum transmission rate that should be used by any host. In such a situation, the maximum pool size may be set to a number of tokens that would allow the maximum desired transmission rate of 2 gigabytes per second.

The Guest Write Buffer Monitor

When applications in host-1 send to-be-transmitted data to front-end-1, the data is buffered in a "guest write buffer" until it can be actually transmitted according to the throttling techniques described herein. The guest write buffer has a finite capacity. If applications on host-1 are writing data faster than the data can be transmitted, the guest write buffer can become full. When the guest write buffer is full, host applications must wait for space to become available before submitted more to-be-transmitted data to the front-end-1. Thus, one way to reduce ingestion of data into the front-end-1 is to reduce the size of the guest write buffer. Stated another way, a smaller guest write buffer serves as a "hint" to the applications to slow down their write requests, while a larger guest write buffer serves as a "hint" to application that they may increase the rate of their write requests.

Guest write buffer monitor 200 monitors the usage level of the guest write buffer. Guest write buffer monitor 200 communicates the usage level information to I/O policy engine 202. Based on the usage level information and the information from pool bandwidth monitor 206, I/O policy engine 202 may cause the guest write buffer to grow or shrink, as needed.

For example, in response to detecting very high aggregate write latencies, I/O policy engine 202 may shrink the guest write buffer in addition to reducing the number of tokens in the token pool. On the other hand, in response to very low aggregate write latencies, I/O policy engine 202 may both increase the size of the guest write buffer and increase the number of tokens in the token pool.

The Resource Scheduler

The resource scheduler 204 determines when to-be-transmitted data is actually transmitted from the host over the network(s) to the appropriate data nodes. Rather than send the to-be-transmitted data immediately upon receipt of the data at the front-end module, the to-be-transmitted data is instead queued until an event-triggering condition is true.

According to one embodiment, the event-triggering condition is that the host in which the resource scheduler resides has a sufficient number of available-tokens in its token pool to send the to-be-transmitted data. Thus, if the to-be-transmitted data is an 8 megabyte data item, and each token corresponds to 1 megabyte, then the event-triggering condition is satisfied when the token pool has 8 available-tokens. As mentioned above, after transmitting the 8 megabyte data item, those 8 available-tokens are converted to unavailable-tokens, thereby reducing the number of available-tokens in the token pool (but not the total number of tokens in the token pool).

Figure 3:
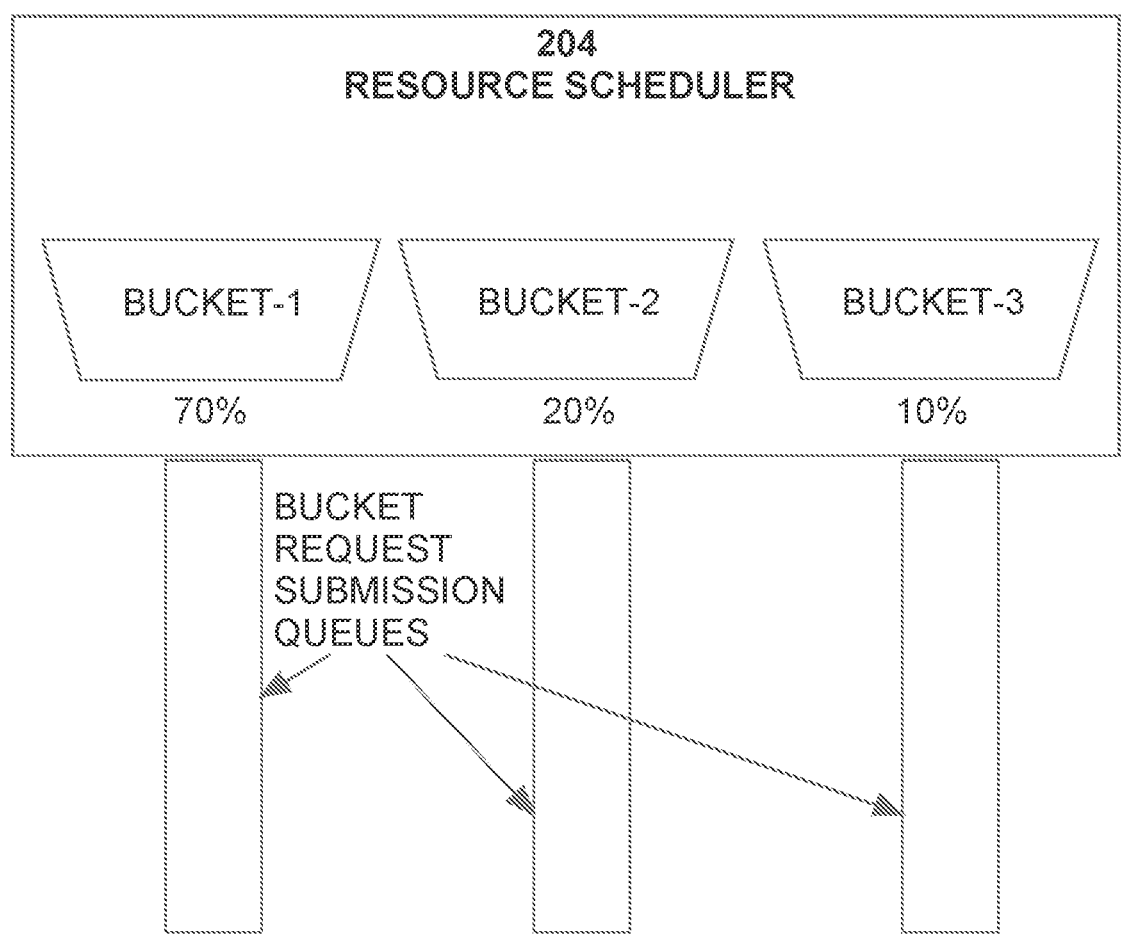
FIG. 3 is a block diagram of the resource scheduler of FIG. 2 illustrated in greater detail.

In some situations, all to-be-transmitted data is treated equally, and transmitted in a FIFO fashion. In other situations, to-be-transmitted data may be categorized and stored in separate queues based on the category to which the to-be-transmitted belongs. FIG. 3 is a block diagram of resource scheduler 204 configured to transmit to-be-transmitted data based on the category to which the to-be-transmitted data belongs.

Referring to FIG. 3, resource scheduler includes three buckets (bucket-1, bucket-2 and bucket-3). Each of the bucket corresponds to a category of data. As to-be-transmitted data is received from processes running on host-1, the to-be-transmitted data is categorized and placed in a queue that corresponds to the appropriate bucket. The categories may correspond to the type of operation that produced the to-be-transmitted data, the type of application that produced the to-be-transmitted data, the user that is using the application that produced the to-be-transmitted data, etc. For example, in one embodiment, one category may be writes of new data to the data nodes (guest pack data), and another category may be writes that are being performed merely to repack data that has already been written to the data nodes (repack data). The techniques described herein are not limited to any particular categorization criteria.

Each bucket is assigned a percentage that determines how frequently that category of data is selected for transmission relative to other categories of data. In the example illustrated in FIG. 3, bucket-1 is assigned 70%, bucket-2 is assigned 20%, and bucket-3 is assigned 10%. Thus, to-be-transmitted data that belongs to the category associated with bucket-1 will be selected for transmission 70% of the time, to-be-transmitted data that belongs to the category associated with bucket-2 will be selected for transmission 20% of the time, and to-be-transmitted data that belongs to the category associated with bucket-3 will be selected for transmission 10% of the time.

Once percentages have been assigned to the buckets, the data that is actually selected for transmission may be determined by generating a random number. If the number falls between 1 and 70, then the to-be-transmitted data that is at the head of the queue for bucket-1 is selected for transmission. If the number falls between 71 and 90, then the to-be-transmitted data that is at the head of the queue for bucket-2 is selected for transmission. If the number falls between 91 and 100, then the to-be-transmitted data that is at the head of the queue for bucket-3 is selected for transmission.

As explained above, simply being selected for transmission does not mean that the data is immediately transmitted. Rather, the selected data is transmitted as soon as the token pool has enough available-tokens to transmit the data. As soon as the token pool has enough available-tokens to transmit the data, the data is transmitted, the relevant available-tokens are converted to unavailable tokens, and another random number is generated to select data to be transmitted in the next iteration.

Figure 4:
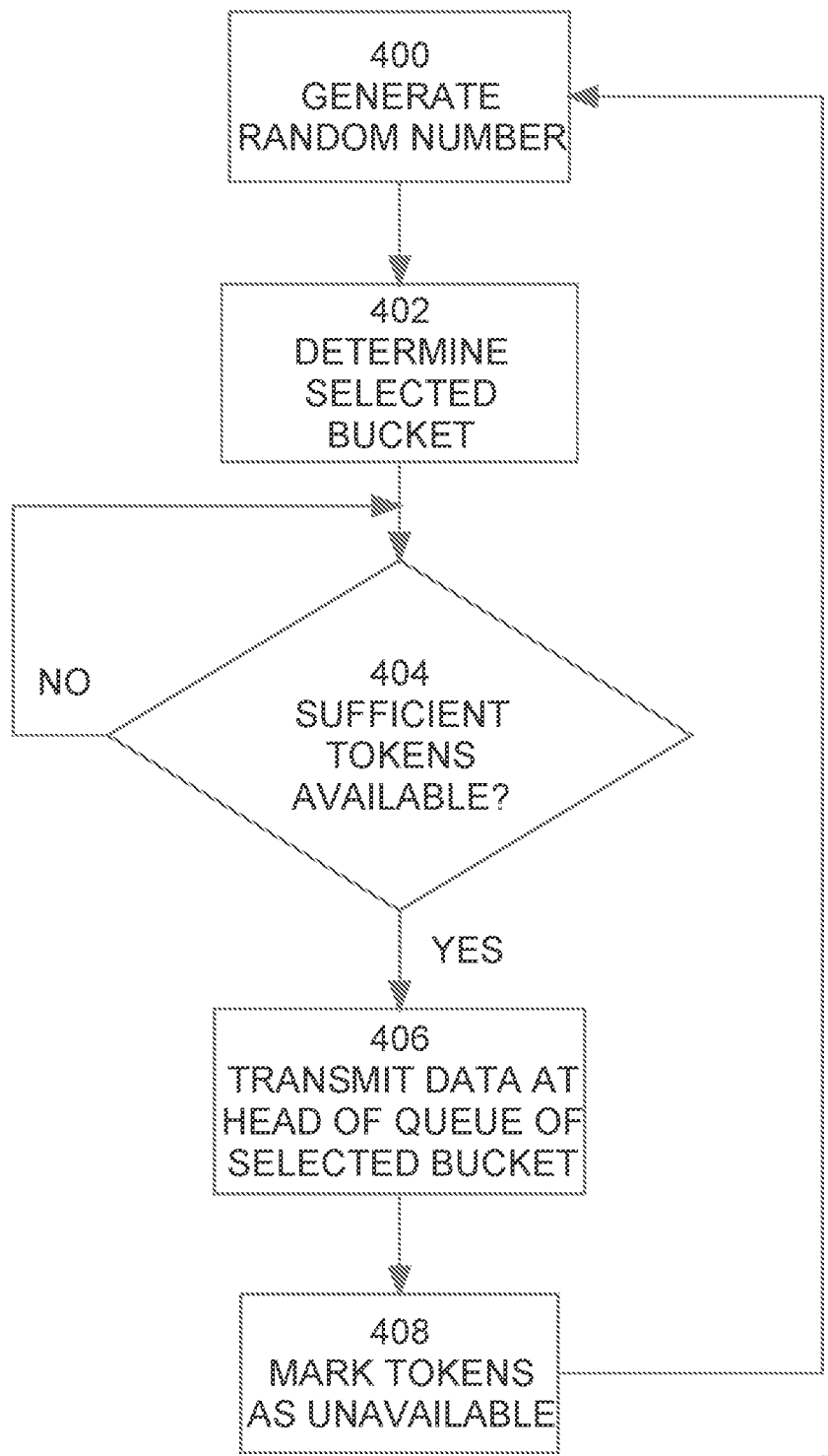
FIG. 4 is a flowchart illustrating logic of a resource scheduler, according to an embodiment.

FIG. 4 is a flowchart that illustrates the operation of resource scheduler 204, according to an embodiment. Referring to FIG. 4, at step 400 a random number is generated. At step 402, it is determined which bucket is selected based on the random number. For example, assume the random number is 80, and the range associated with bucket-2 is 71 and 90. Because 80 falls within the range associated with bucket-2, bucket-2 is selected for the next transmission.

At step 404, it is determined whether the number of available-tokens is sufficient to cover the size of the to-be-transmitted data at the head of the queue for bucket-2. For the purpose of explanation, it shall be assumed that an 8 megabyte data item is at the head of the queue for bucket-2, and that each token corresponds to 1 megabyte. Under these circumstances, step 404 involves determining whether 8 tokens are available.

If 8 tokens are not available, the resource scheduler 204 delays the transmission. As soon as 8 tokens are available, control passes to step 406 where the data at the head of the queue for the currently-selected bucket is transmitted. After the transmission, the available-tokens that were used to send the data are converted to unavailable-token (step 408) and the process repeats itself.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
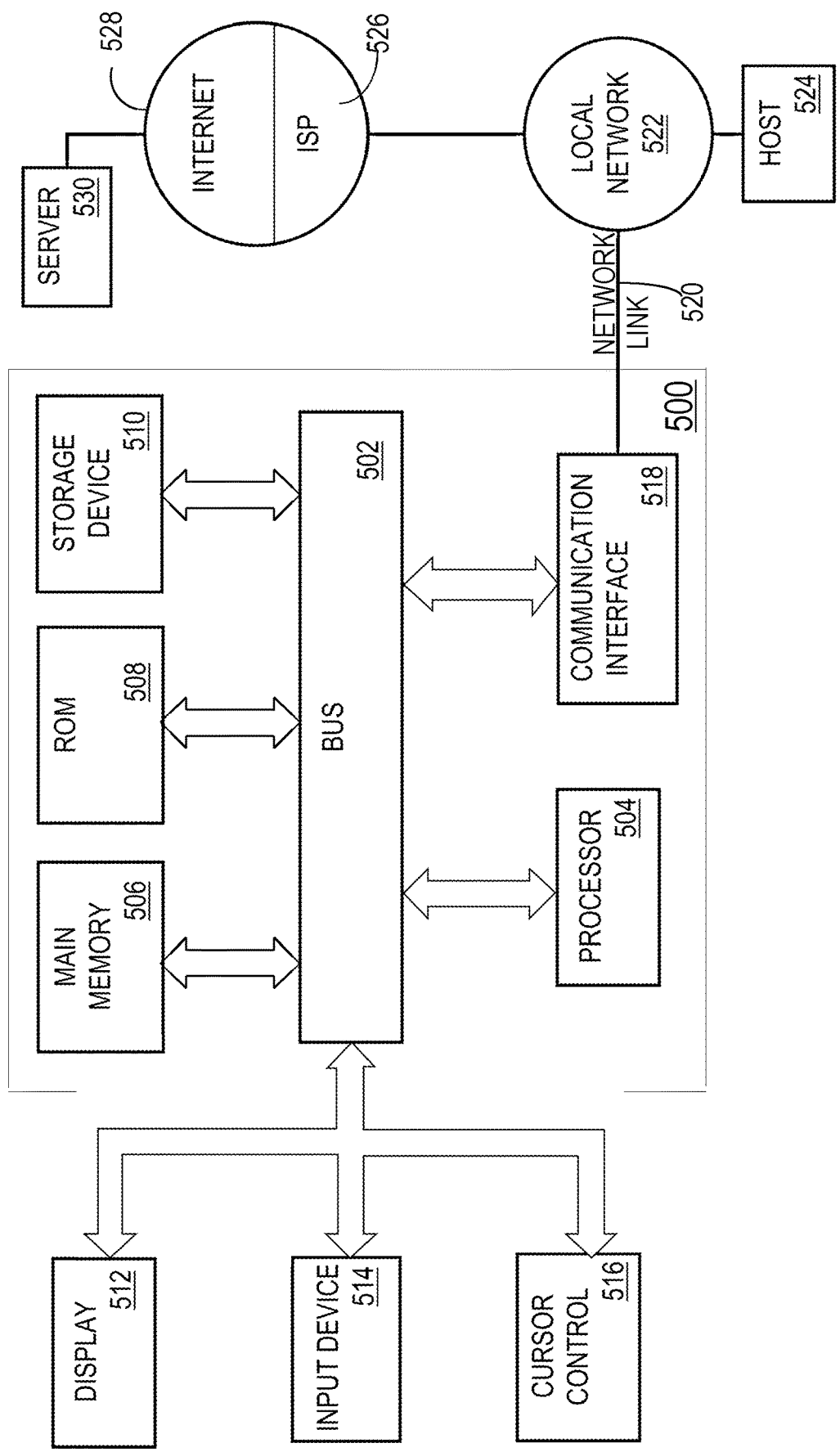
FIG. 5 is a block diagram of a computer system upon which embodiments of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   performing multiple writes for a host device of a plurality of host devices;
   wherein each write of the multiple writes is to one of multiple storage nodes;
   wherein the multiple writes include writes to a plurality of the multiple storage nodes;
   deriving a host-level latency for the host device based on write-level latencies experienced during the writes to the plurality of storage nodes;
   receiving one or more write requests from one or more applications running on the host device, wherein each write requests comprises a data item;
   determining to delay transmission of a first data item based on a size of the first data item and a measure of available host-to-data-node bandwidth, wherein the measure of available host-to-data-node bandwidth dynamically varies based on the derived host-level latency; and
   in response to determining that the measure of available host-to-data-node bandwidth has increased by a threshold amount, transmitting the first data item from the host device.

2. The method of claim 1 wherein transmitting the first data item includes:
   breaking the first data item into multiple write blocks; and
   writing each write block of the multiple write blocks to a distinct one storage node of the multiple storage nodes;
   wherein the target data is thereby written to two or more of the multiple storage nodes.

3. The method of claim 1 wherein delaying transmission of the first data item from the host device based on a size of the first data item and a measure of available host-to-data-node bandwidth comprises:
   establishing a token pool for the host device, wherein a number of tokens in the token pool represents the measure of available host-to-data-node bandwidth;
   setting the number of tokens in the token pool based, at least in part, on the determined host-level latency;
   when data is transmitted by the host device, converting available-tokens in the token pool to unavailable-tokens;
   when acknowledgements are received by the host device, converting unavailable-tokens in the token pool to available-tokens; and
   delaying transmission of the first data item until the token pool has a sufficient number of available-token to cover the size of the first data item.

4. The method of claim 3 further comprising:
   increasing the number of tokens in the token pool when the host-level latency falls below a first threshold; and
   decreasing the number of tokens in the token pool when the host-level latency exceeds a second threshold.

5. The method of claim 1 further comprising:
   after receiving the first data item, categorizing the first data item into a particular category of a plurality of categories;
   wherein each category of the plurality of categories is associated with a distinct numerical range;
   generating a random number;
   determining that the random number falls into the range associated the particular category; and
   responsive to determining that the random number falls into the range associated the particular category, establishing the first data item as the next data to be transmitted by the host device.

6. A method comprising:
   receiving a write request from a process running on a host device, wherein the write request comprises a data item;
   determining whether a token pool of the host device has sufficient available-tokens to write the data item, wherein each token corresponds to a fixed measure of bandwidth usage;
   when there are not sufficient available-tokens in the token pool of the host device to write the data item, postponing writing the target data until there are enough available-tokens in the token pool of the host device to write the target data;
   when there are sufficient available-tokens in the token pool of the host device to write the target data:
   breaking the target data into multiple write blocks;
   writing each write block of the multiple write blocks to a distinct storage node of a plurality of storage nodes;
   responsive to writing the data item, converting available-tokens used to write the data item to unavailable-tokens in the token pool;
   receiving one or more acknowledgements from respective storage nodes confirming receipt of data transmitted from the host; and
   responsive to receiving the one or more acknowledgements, converting unavailable-tokens equivalent to a size of the data acknowledged as received to available-tokens.

7. The method of claim 6 further comprising:
   periodically generating a host-level indication of congestion between the host node and the plurality of storage nodes; and
   adjusting a number of tokens in the token pool based, at least in part, on the host-level indication.

8. The method of claim 7 wherein generating the host-level indication of congestion is performed by:
   monitoring latency between the host device and each of the plurality of storage nodes during a window of time, wherein the latency between the host device and a storage node comprises an amount of time between sending data and receiving acknowledgements that the data was successfully received by the storage node;
   based on the latency between the host device and each of the plurality of storage nodes during a window of time, generating an aggregate host-level latency value; and
   using the aggregate host-level latency value as the host-level indication of congestion.

9. The method of claim 7 wherein adjusting the number of tokens includes increasing the number of tokens under low congestion conditions and decreasing the number of tokens under high congestion conditions.

10. The method of claim 9 further comprising sending a hint that a write buffer within the host device should shrink in response to detecting high congestion conditions.

11. One or more non-transitory computer-readable storage media storing instructions which, when executed by one or more computing devices, cause:
performing multiple writes for a host device of a plurality of host devices;
wherein each write of the multiple writes is to one of multiple storage nodes;
wherein the multiple writes include writes to a plurality of the multiple storage nodes;
deriving a host-level latency for the host device based on write-level latencies experienced during the writes to the plurality of storage nodes;
receiving one or more applications running on the host device, wherein each write requests comprises a data item;
determining to delay transmission of a first data item based on a size of the first data item and a measure of available host-to-data-node bandwidth, wherein the measure of available host-to-data-node bandwidth dynamically varies based on the derived host-level latency; and
in response to determining that the measure of available host-to-data-node bandwidth has increased by a threshold amount, transmitting the first data item from the host device.

12. The one or more non-transitory computer-readable storage media of claim 11 wherein transmitting the first data item includes:
breaking the first data item into multiple write blocks; and
writing each write block of the multiple write blocks to a distinct one storage node of the multiple storage nodes;
wherein the target data is thereby written to two or more of the multiple storage nodes.

13. The one or more non-transitory computer-readable storage media of claim 11 wherein the instructions further cause:
after receiving the first data item, categorizing the first data item into a particular category of a plurality of categories;
wherein each category of the plurality of categories is associated with a distinct numerical range;
generating a random number;
determining that the random number falls into the range associated the particular category; and
responsive to determining that the random number falls into the range associated the particular category, establishing the first data item as the next data to be transmitted by the host device.

14. The one or more non-transitory computer-readable storage media of claim 11 wherein delaying transmission of the first data item from the host device based on a size of the first data item and a measure of available host-to-data-node bandwidth comprises:
establishing a token pool for the host device, wherein a number of tokens in the token pool represents the measure of available host-to-data-node bandwidth;
setting the number of tokens in the token pool based, at least in part, on the determined host-level latency;
when data is transmitted by the host device, converting available-tokens in the token pool to unavailable-tokens;
when acknowledgements are received by the host device, converting unavailable-tokens in the token pool to available-tokens; and
delaying transmission of the first data item until the token pool has a sufficient number of available-token to cover the size of the first data item.

15. The one or more non-transitory computer-readable storage media of claim 14 wherein the instructions further cause:
increasing the number of tokens in the token pool when the host-level latency falls below a first threshold; and
decreasing the number of tokens in the token pool when the host-level latency exceeds a second threshold.

16. One or more non-transitory computer-readable storage media storing instructions which, when executed by one or more computing devices, cause:
receiving a write request from a process running on a host device, wherein the write request comprises a data item;
determining whether a token pool of the host device has sufficient available-tokens to write the data item, wherein each token corresponds to a fixed measure of bandwidth usage;
when there are not sufficient available-tokens in the token pool of the host device to write the data item, postponing writing the target data until there are enough available-tokens in the token pool of the host device to write the target data;
when there are sufficient available-tokens in the token pool of the host device to write the target data:
breaking the target data into multiple write blocks;
writing each write block of the multiple write blocks to a distinct storage node of a plurality of storage nodes;
responsive to writing the data item, converting available-tokens used to write the data item to unavailable-tokens in the token pool;
receiving one or more acknowledgements from respective storage nodes confirming receipt of data transmitted from the host; and
responsive to receiving the one or more acknowledgements, converting unavailable-tokens equivalent to a size of the data acknowledged as received to available-tokens.

17. The one or more non-transitory computer-readable storage media of claim 16 wherein the instructions further cause:
periodically generating a host-level indication of congestion between the host node and the plurality of storage nodes; and
adjusting a number of tokens in the token pool based, at least in part, on the host-level indication.

18. The one or more non-transitory computer-readable storage media of claim 17 wherein generating the host-level indication of congestion is performed by:
monitoring latency between the host device and each of the plurality of storage nodes during a window of time, wherein the latency between the host device and a storage node comprises an amount of time between sending data and receiving acknowledgements that the data was successfully received by the storage node;
based on the latency between the host device and each of the plurality of storage nodes during a window of time, generating an aggregate host-level latency value; and
using the aggregate host-level latency value as the host-level indication of congestion.

19. The one or more non-transitory computer-readable storage media of claim 17 wherein adjusting the number of tokens includes increasing the number of tokens under low congestion conditions and decreasing the number of tokens under high congestion conditions.

20. The one or more non-transitory computer-readable storage media of claim 19 wherein the instructions further cause sending a hint that a write buffer within the host device should shrink in response to detecting high congestion conditions.

\* \* \* \* \*